(12) United States Patent
Kirkpatrick et al.

(10) Patent No.: US 7,502,533 B2
(45) Date of Patent: Mar. 10, 2009

(54) MECHANISM FOR CONDITIONING LAUNCHED BEAMS FROM AN OPTICAL TRANSMITTER

(75) Inventors: Peter Kirkpatrick, San Francisco, CA (US); Marc Epitaux, Sunnyvale, CA (US); Jan Peeters Weem, Union City, CA (US); Dana Rose, San Jose, CA (US); Mark McDonald, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 11/411,350

(22) Filed: Apr. 25, 2006

(65) Prior Publication Data
US 2007/0274629 A1    Nov. 29, 2007

(51) Int. Cl.
  *G02B 6/26* (2006.01)
  *G02B 6/42* (2006.01)
(52) U.S. Cl. ........................................... 385/29
(58) Field of Classification Search ................ None
  See application file for complete search history.

(56) References Cited

U.S. PATENT DOCUMENTS

| | | | |
|---|---|---|---|
| 5,416,862 A * | 5/1995 | Haas et al. | 385/28 |
| 5,848,204 A * | 12/1998 | Wanser | 385/12 |
| 6,044,188 A * | 3/2000 | Kropp | 385/33 |
| 6,064,786 A | 5/2000 | Cunningham et al. | |
| 6,091,537 A * | 7/2000 | Sun et al. | 359/248 |
| 6,157,757 A | 12/2000 | Giaretta et al. | |
| 6,185,346 B1 * | 2/2001 | Asawa et al. | 385/28 |
| 6,580,543 B1 * | 6/2003 | Fan et al. | 398/200 |
| 6,609,834 B2 | 8/2003 | Cunningham et al. | |
| 7,283,701 B2 * | 10/2007 | Hallemeier et al. | 385/28 |
| 2002/0071638 A1 * | 6/2002 | Musk | 385/52 |
| 2002/0105699 A1 * | 8/2002 | Miracky et al. | 359/159 |
| 2003/0072525 A1 * | 4/2003 | Sjodin et al. | 385/31 |
| 2005/0259916 A1 * | 11/2005 | Jenkins et al. | 385/31 |
| 2005/0265653 A1 * | 12/2005 | Cai et al. | 385/28 |
| 2006/0147150 A1 * | 7/2006 | Epitaux | 385/14 |
| 2006/0171631 A1 * | 8/2006 | Deng et al. | 385/28 |
| 2006/0285805 A1 * | 12/2006 | Healy | 385/92 |

* cited by examiner

*Primary Examiner*—Michelle R. Connelly-Cushwa
*Assistant Examiner*—Chris Chu
(74) *Attorney, Agent, or Firm*—Blakely, Sokoloff, Taylor & Zafman LLP

(57) ABSTRACT

A system is disclosed. The system includes an optical waveguide; and an optical transmitter coupled to the optical waveguide. The transmitter includes a optical relay to condition a launch of an optical beam into the optical waveguide to minimize a number of optical modes launched into the optical waveguide.

16 Claims, 8 Drawing Sheets

MECHANISM FOR CONDITIONING LAUNCHED BEAMS FROM AN OPTICAL TRANSMITTER

FIELD OF THE INVENTION

The present invention relates optical communications; more particularly, the present invention relates to increasing the distance of an optical link.

BACKGROUND

Currently, optical input/output (I/O) is used in network systems to transmit data between computer system components. Optical I/O is able to attain higher system bandwidth with lower electromagnetic interference than conventional I/O methods. In order to implement optical I/O, radiant energy is coupled to a fiber optic waveguide from an optoelectronic integrated circuit (IC).

Typically, a fiber optic communication link includes a fiber optic transmitting device such as a laser, an optical interconnect link, and a light receiving element such as a photo detector. Currently, 10 Gbits/s optical links using an 850 nm transceiver over multi-mode fiber are implemented in network systems.

However, existing multi-mode fibers were installed for slower data rates 1 Gbit/s operation. At 10 Gbits/s modal dispersion causes optical signals to be degraded. Modal dispersion is significant in Multi-mode Fibers (MMF), widely used in shorter reach applications up to a few hundred meters. MMF modal dispersion is caused by an optical pulse that splits into several paths (modes) traveling at different speeds down a fiber. This different traveling speed and path length create Inter-symbol interference (ISI). ISI is when one bit runs into other bits, which limits the data-rate of the link or limits the link distance.

At 10 Gbits/s modal dispersion is more dramatic than at 1 Gbit/s especially over old legacy fibers. Using existing multi-mode fibers links originally installed for 1 Gbit/s to run 10 Gbits/s shows evident bandwidth limitation due to modal dispersion. In contrast good fibers could prevent error-free transmission at 10 Gbits/s over longer distance.

A current solution to overcome modal dispersion at 10 Gbits/s over a few hundred-meter legacy multi-mode links is to multiplex four individual data streams at ¼ of the data rate onto a fiber at different optical wavelengths. However, this solution is relatively expensive and is not scalable to smaller transceivers form factors (e.g., XFP).

The following are additional techniques that attempt to overcome modal dispersions at 10 Gbits/s. The techniques are to use longer wavelength, restrict the launch condition from the laser into the fiber, and use an electronic dispersion technique to compensate for signal distortions.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, mechanisms to condition a beam launched into an optical waveguide or optical fiber are disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
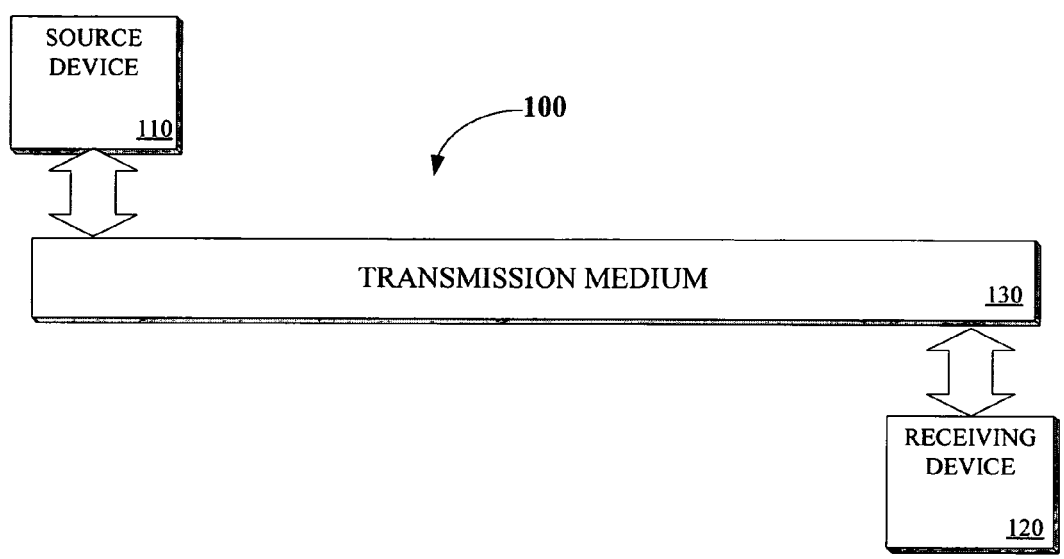
FIG. 1 illustrates one embodiment of a network.

FIG. 1 illustrates one embodiment of a network 100. Network 100 includes a computer system 110 and a computer system 120 coupled via a transmission medium 130. In one embodiment, computer system 110 operates as a source device that transmits data to computer system 120, operating as a receiving device. The data may be, for example, a file, programming data, an executable, voice data, or other digital objects. The data is sent via data transmission medium 130.

According to one embodiment, network 100 is a wide area network, and data transmission medium 130 is implemented via an optical link. In a further embodiment, computer system 110 may be a data server, while computer system 120 is a personal computer system.

Figure 2:
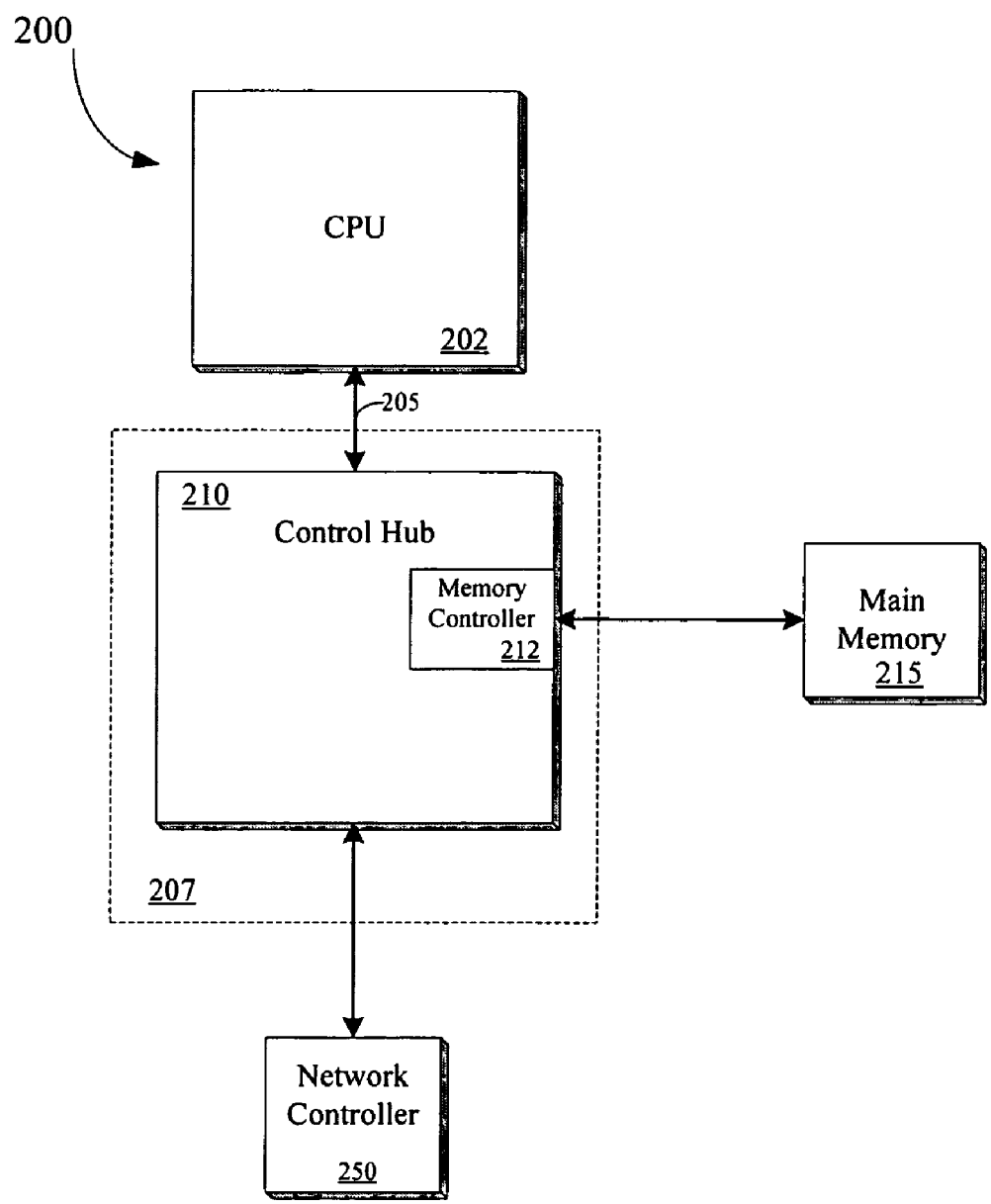
FIG. 2 illustrates one embodiment of a computer system.

FIG. 2 is a block diagram of one embodiment of a computer system 200. Computer system 200 may be implemented as computer system 110 or computer system 120 (both shown in FIG. 1). Computer system 200 includes a central processing unit (CPU) 202 coupled to an interface 205. In one embodiment, CPU 202 is a processor in the Pentium® family of processors including the Pentium® IV processors available from Intel Corporation of Santa Clara, Calif. Alternatively, other CPUs may be used. In a further embodiment, CPU 202 may include multiple processor cores.

According to one embodiment, interface 205 is a front side bus (FSB) that communicates with a control hub 210 component of a chipset 207. Control hub 210 includes a memory controller 212 that is coupled to a main system memory 215. Main system memory 215 stores data and sequences of instructions and code represented by data signals that may be executed by CPU 102 or any other device included in system 200.

In one embodiment, main system memory 215 includes dynamic random access memory (DRAM); however, main system memory 215 may be implemented using other memory types. According to one embodiment, control hub 210 also provides an interface to input/output (I/O) devices within computer system 200.

For example control hub 210 may be coupled to a network controller 250. Network controller 250 that facilitates a wide area network between computer system 200 and a remote device. According to one embodiment, network controller 250 communicates data between computer system 110.

In one embodiment, the wide area network is implemented via a 10 Gbits/s optical link using multi-mode fiber coupled between computer system 110 and 120. As discussed above, modal dispersion causes optical signals operating at 10 Gbits/s to be degraded at certain distances.

According to one embodiment, network controller 250 includes an optical transmitter that reduces modal dispersion by conditioning the launch of beams to minimize the number of optical modes launched into an optical fiber.

Figure 3:
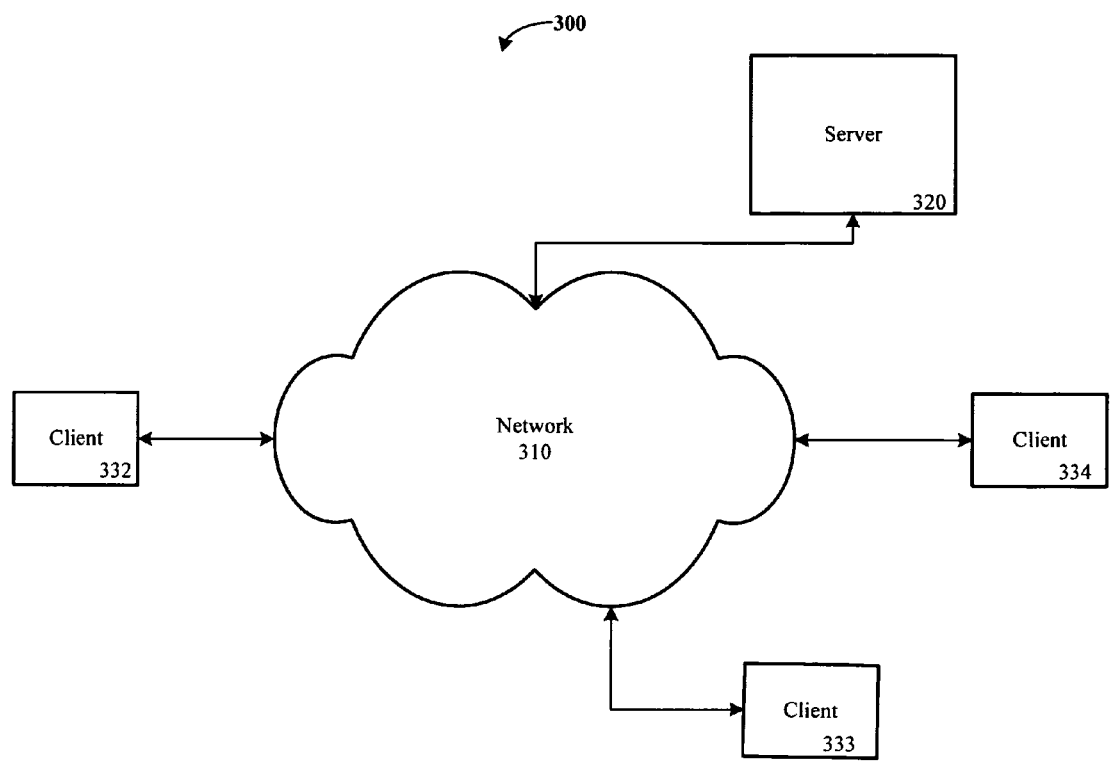
FIG. 3 illustrates another embodiment of a network.

FIG. 3 is a block diagram of one embodiment of a system 300 that computer system 200 in FIG. 2 may be used in. System 300 includes network 310, a server 320 and clients 332, 333 and 334. The teachings disclosed herein might be applied to various networks, data and document storage and archival facilities, or other types of client/server systems that have documents or other information available upon request.

According to one embodiment, server 320 and clients 332-334 are coupled to network 310 and are able to respond to requests from each other via network 310. In one embodiment, the received requests are associated with the Internet (or World Wide Web (the WWW)). In such an embodiment, server 320 and clients 332-334 act as inter-networked communications systems (e.g., WWW servers). That is, clients 332-334 are directly coupled to a local area network (LAN) or wide area network (WAN) and "serve" data, such as images or other multi-media objects that they capture or create to the servers. In one embodiment, the communications channels may be over optical transmission mediums.

MEMS Scanner to Control Optical Launched Beam

Figure 4:
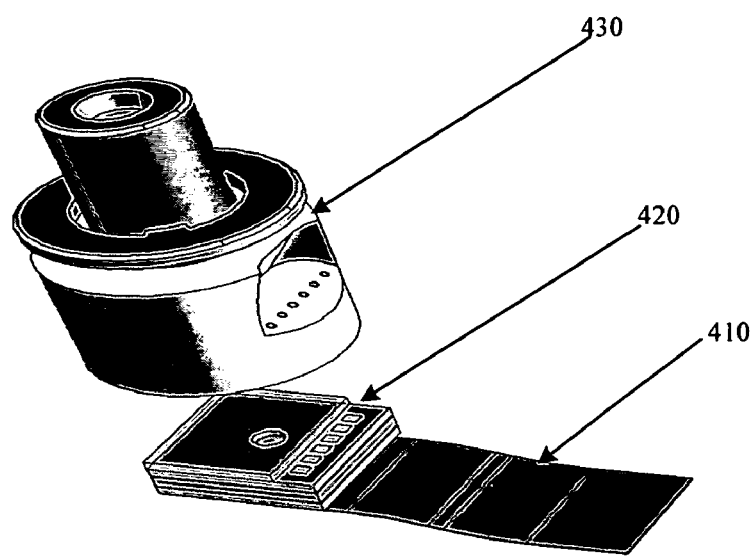
FIG. 4 illustrates one embodiment of an optical transmitter.

FIG. 4 illustrates an exploded view of one embodiment of a transmitter optical sub-assembly 420 and a coaxial optical connector 430. As shown in FIG. 4, transmitter 420 has a configuration similar to a TO-can package. However for transmitter 420, the TO header is replaced by a vertical hermetic silicon bench sub-assembly. In contrast to the TO package assembly, connector 430 may be passively bonded to transmitter 420 without requiring complex active alignment and welding equipment. This is because in one embodiment the vertical silicon optical bench may contain an integrated optical alignment capability (e.g. MEMS scanner). The base of transmitter 420 is coupled to an electrical flex circuit 410.

Figure 5:
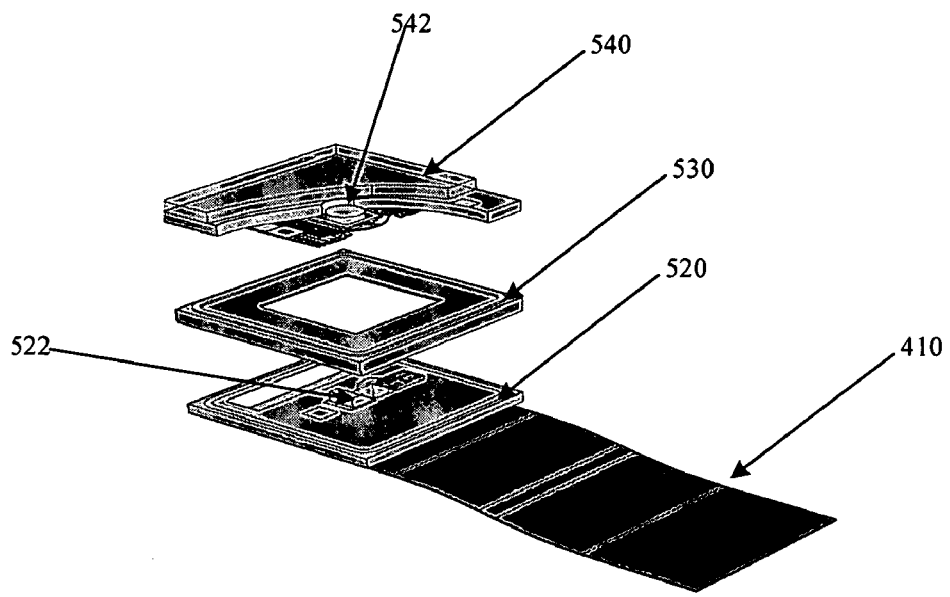
FIG. 5 illustrates another embodiment of an optical transmitter header.

FIG. 5 illustrates an exploded view of another embodiment of transmitter optical sub-assembly 520. Transmitter 520 includes a stack of three micro-machined silicon layers 520, 530 and 540. Lower silicon element 520 includes active optical components (e.g., lasers, monitoring photodiode, and other miscellaneous electrical components) and microwave matching circuitry. According to one embodiment, a turning mirror 522 is located on the layer 520 substrate to deflect a laser beam towards silicon layers 530 and 540, and connector 330. In yet another embodiment, turning mirror may be removed if a surface-emitting laser is used.

In a further embodiment, silicon micro-machining techniques are implemented to provide passive optical alignment, hermetic sealing and controlled impedance feed-throughs to the bottom of the substrate. The external connections are further carried from the bottom of the substrate to flex circuit 310. The middle element 530 operates as a spacer and a seal ring.

Figure 6:
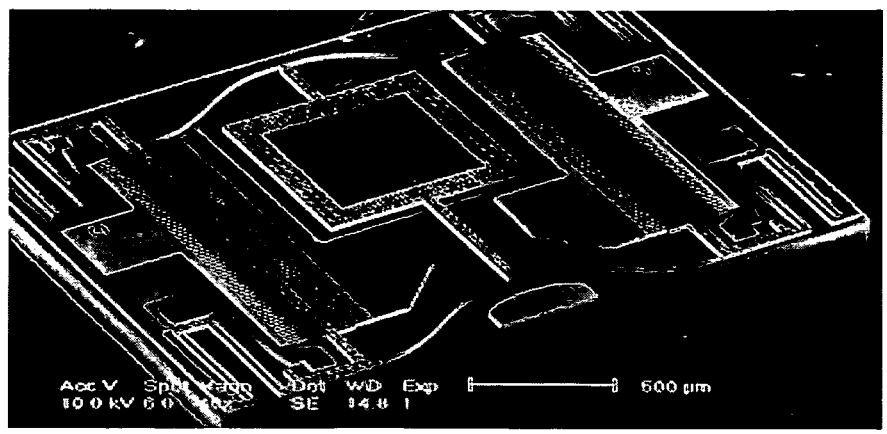
FIG. 6 illustrates one embodiment of an integrated optical alignment device.

The top layer 540 includes a focusing lens 542 attached to a Micro-Electro-Mechanical Systems (MEMS) actuator (2-D or 3-D). Thus, the top layer 540 operates as a MEMS scanner. FIG. 6 illustrates one embodiment of a 2-D MEMS optical alignment scanner incorporated into transmitter 420. In one embodiment, electrical connections to the MEMS actuators are provided so that a lens 542 relay can adjust a launching beam into a multi-mode fiber core coupled to connector 430, once transmitter 420 has been fully assembled.

Figure 7:
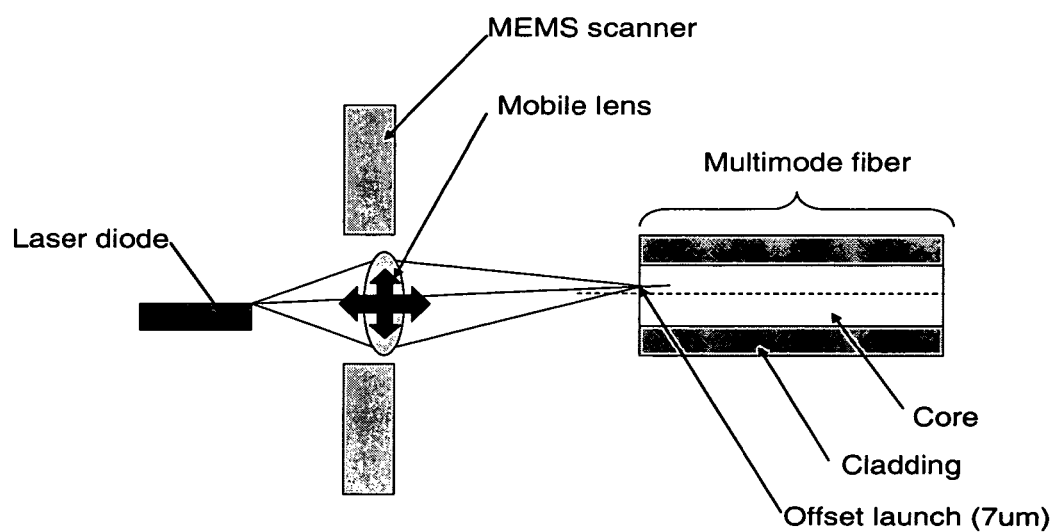
FIG. 7 illustrates one embodiment of an optical transmitter optically coupled to a multi-mode fiber.

FIG. 7 illustrates one embodiment of optical transmitter 420 optically coupled through a lens to a multi-mode optical fiber having a core and cladding around the core. In one embodiment optical transmitter 420 includes a laser diode. As shown in FIG. 7, the MEMS scanner is implemented to adjust a mobile lens in order to adjust an offset of a launch beam into the fiber core. Therefore an appropriate launch condition may be chosen (e.g., center launch, offset launch, overfilled launch, etc . . . ) that gives for a particular multimode fiber the lowest modal dispersion, and therefore minimizes ISI.

In one embodiment, the alignment may be made by a user at anytime after the manufacture of transmitter 420 in order to adapt to different fibers. However in other embodiments, an adjustment is made once for a specific fiber. In such embodiment, the MEMS alignment is permanently locked after the initial alignment.

Pinhole Mode Conditioner

Figure 8:
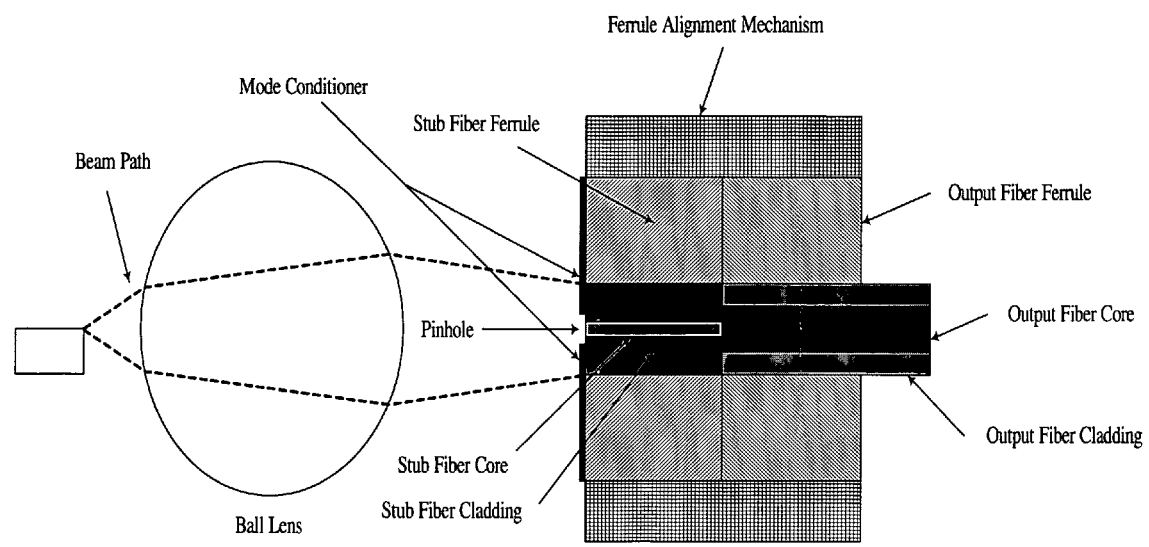
FIG. 8 illustrates one embodiment of an optical transmitter optically coupled to a multi-mode fiber.

FIG. 8 illustrates one embodiment of an optical transmitter optically coupled to a multi-mode optical fiber via a ferrule alignment mechanism. The optical transmitter includes a laser diode that transmits an optical beam to the connector via a ball lens. In one embodiment, the connector includes a single mode fiber (SMF) stub component and a MMF output fiber component, which are aligned by a ferrule alignment mechanism. Each side of the connector includes a fiber core completely surrounded by fiber cladding.

In existing optical systems, the optical beam launched into the stub fiber fills the fiber as well as the cladding. As a result, the light received in the cladding may propagate through the stub cladding incident on the output fiber core, leading to an increase in the number of optical modes propagated that cause dispersion.

According to one embodiment, a mode conditioner is provided that includes a pinhole patterned on one face of the SMF stub. The pinhole prevents light from the laser source from being transmitted into the cladding modes in the stub. Thus, the beam is conditioned such that a minimum number of propagating optical modes are excited at the interface between the mode conditioner and a multimode fiber (MMF) or waveguide, resulting in the modes launched into MMF from the stub being minimized.

In one embodiment, the mode conditioner/pinhole is created by first depositing an absorbing material onto the facet of the fiber stub. In another embodiment, the pinhole could be burned through the material using a high powered laser source coupled into SMF and aligned to the opposite facet of the stub. By adjusting the power and duration of the burning, the pinhole size can be optimized and controlled.

Grating Mode Conditioner

Figure 9:
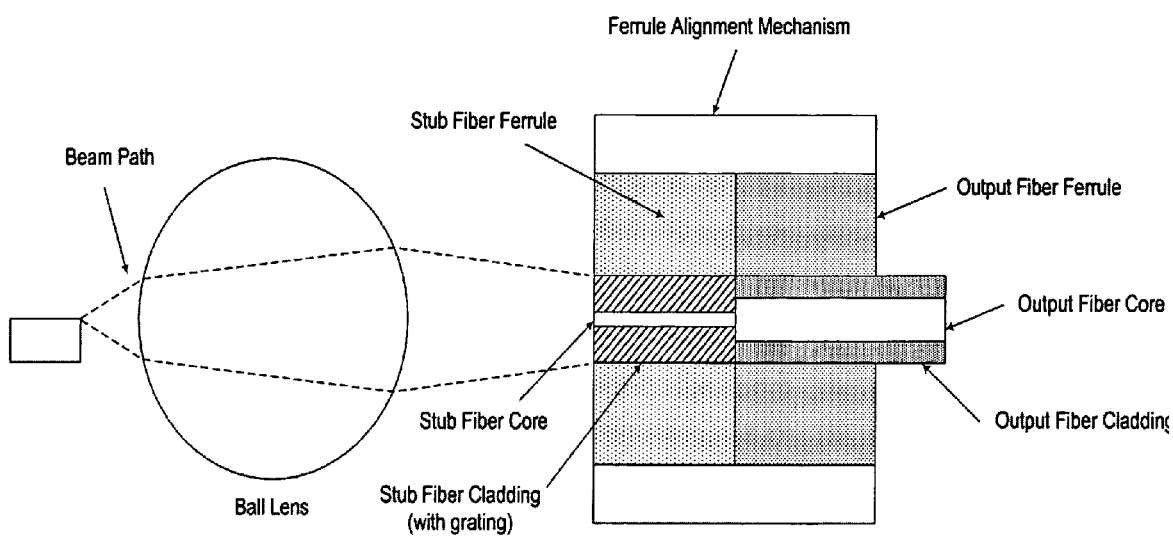
FIG. 9 illustrates another embodiment of an optical transmitter optically coupled to a multi-mode fiber.

FIG. 9 illustrates another embodiment of an optical transmitter optically coupled to a multi-mode optical fiber via a connector. In this embodiment, a grating is included in the stub fiber cladding (single mode) to reflect light present in the outer cladding, but allow transmission of light in the core of the stub. Accordingly, this will filter out the light injected in the fiber cladding and lead to a more tightly controlled launch into the output fiber. In one embodiment, the grating is arranged at an angular pitch (e.g., non-perpendicular to the axis of propagation) to disperse any light in the cladding. The smaller light spot size created by this method will have better propagation properties over multimode fibers, and lead to lower modal dispersion.

The pinhole and grating mode condition mechanisms excite fewer modes, resulting in extended transmission distance in a wide range of fibers or lower propagation penalty at a fixed distance. The mode conditioner also reduces the difference in coupled power between SMF and MMF, allowing SMF/MMF compatibility at a common power level.

Figure 10A:
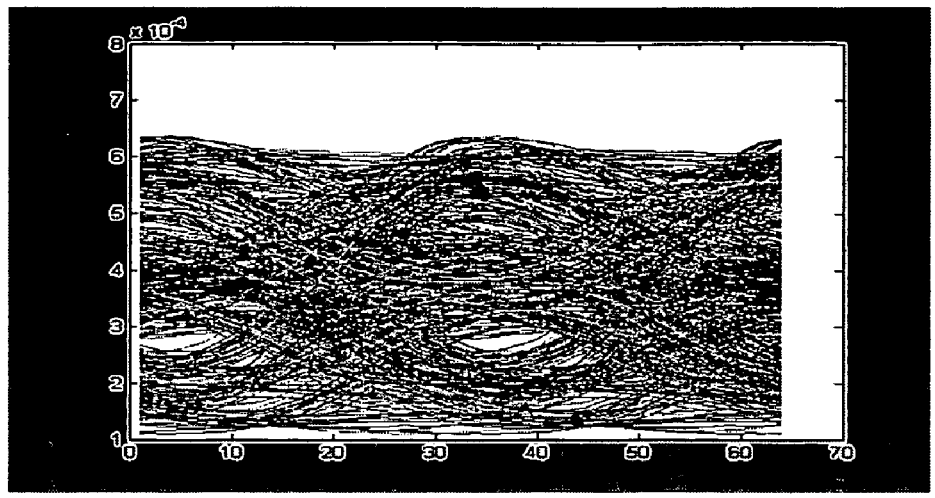
FIGS. 10A & 10B illustrate embodiments of eye diagrams for data patterns.
Figure 10B:
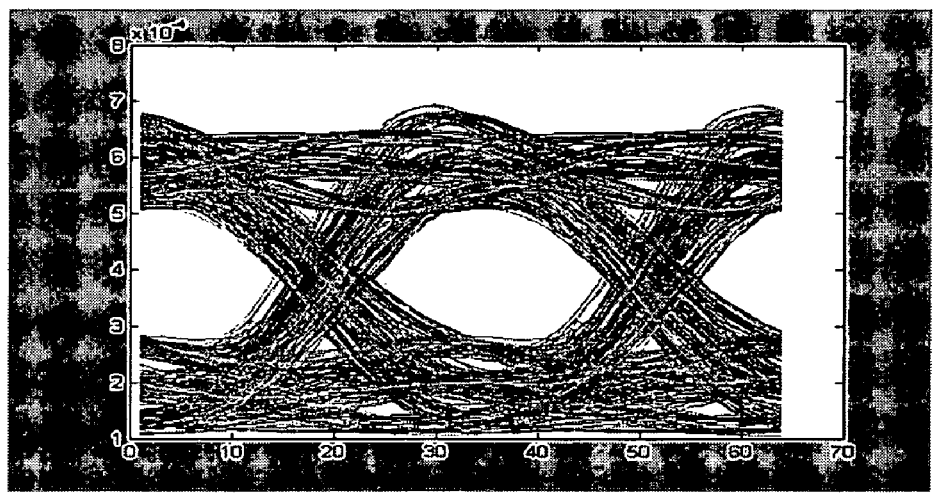

FIGS. 10A & 10B illustrate embodiments of eye diagrams of 10 Gbits/s data patterns after propagation through 300 m of multimode fiber. FIG. 10A illustrates a data pattern without mode conditioning according to embodiments of the present invention, while FIG. 10B illustrates a data pattern with mode conditioning according to embodiments of the present invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system an optical waveguide; and
   an optical transmitter, including:
   a silicon layer having active optical components;
   a spacer layer; and
   a Micro-Electro-Mechanical Systems (MEMS) layer having an integrated adjustable lens to condition a launch of an optical beam into the optical waveguide to minimize a number of optical modes launched into the optical waveguide.

2. The system of claim 1 further comprising a MEMS actuator coupled to the MEMS layer.

3. The system of claim 2 wherein the MEMS layer operates as a MEMS scanner to provide lens adjustment.

4. The system of claim 3 wherein the lens is adjusted at anytime after manufacture of the transmitter to provide optical alignment with the optical waveguide.

5. The system of claim 1 wherein the silicon layer comprises a turning mirror to reflect the optical beam to the MEMS layer.

6. The system of claim 1 further comprising a flex circuit coupled to a base of the silicon layer.

7. A system
   an optical waveguide; and
   an optical transmitter, including:
   a laser diode;
   a lens;
   a fiber stub component having:
   a fiber core; and
   fiber cladding having a grating to reflect an optical beam launched from the fiber cladding to minimize a number of optical modes launched into the optical waveguide; and
   a guiding fiber to guide light from the fiber stub component.

8. The system of claim 7 wherein the grating is positioned at an angular pitch.

9. A method comprising:
   coupling a light source to an optical waveguide; and
   conditioning a launch of an optical beam from the light source into the optical waveguide to minimize a number of optical modes launched into the optical waveguide;
   launching an optical beam from a laser diode on a silicon layer of the transmitter; and
   adjusting a lens on a Micro-Electro-Mechanical Systems (MEMS) layer of the transmitter to launch the optical beam into the optical waveguide.

10. The method of claim 9 further comprising reflecting the optical beam to the MEMS layer via a turning mirror on the silicon layer.

11. An optical transmitter comprising:
    a silicon layer having active optical components;
    a spacer layer; and
    a Micro-Electro-Mechanical Systems (MEMS) layer having an adjustable lens to condition a launch of an optical beam into an optical waveguide to minimize a number of optical modes launched into the optical waveguide.

12. The transmitter of claim 11 further comprising a MEMS actuator coupled to the MEMS layer.

13. The transmitter of claim 12 wherein the MEMS layer operates as a MEMS scanner to provide lens adjustment.

14. The transmitter of claim 11 wherein the silicon layer comprises a turning mirror to reflect the optical beam to the MEMS layer.

15. An optical transmitter comprising:
    a laser diode;
    a lens; and
    a stub component having:
    a fiber core; and
    fiber cladding having a grating to reflect an optical beam launched from the fiber cladding to minimize a number of optical modes launched into the optical waveguide.

16. The transmitter of claim 15 wherein the grating is positioned at an angular pitch.

* * * * *